United States Patent
Tumback

(10) Patent No.: US 6,896,635 B2
(45) Date of Patent: May 24, 2005

(54) TRANSFER CASE FOR MOTOR VEHICLES AND METHOD FOR DISTRIBUTION OF A DRIVING FORCE ONTO TWO MOTOR VEHICLE AXLES

(75) Inventor: Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/446,219

(22) Filed: May 28, 2003

(65) Prior Publication Data

US 2004/0048710 A1 Mar. 11, 2004

(30) Foreign Application Priority Data

Sep. 7, 2002 (DE) .......................................... 102 41 457

(51) Int. Cl.[7] .............................. F16H 3/72; B60K 1/02; B60K 6/00
(52) U.S. Cl. ................... 475/5; 475/6; 477/3; 180/65.2
(58) Field of Search ............................. 475/5, 6; 477/3, 477/4, 27, 7; 180/65.2

(56) References Cited

U.S. PATENT DOCUMENTS

| | | | | |
|---|---|---|---|---|
| 5,017,183 A | * | 5/1991 | Teraoka ...................... | 475/150 |
| 6,464,608 B2 | * | 10/2002 | Bowen et al. .................. | 475/5 |
| 6,533,692 B1 | * | 3/2003 | Bowen ........................... | 475/5 |
| 6,589,128 B2 | * | 7/2003 | Bowen ........................... | 475/5 |
| 6,648,785 B2 | * | 11/2003 | Porter ............................ | 475/5 |
| 6,679,799 B2 | * | 1/2004 | Bowen ........................... | 475/5 |

* cited by examiner

*Primary Examiner*—Tisha Lewis
(74) *Attorney, Agent, or Firm*—Michael J. Striker

(57) ABSTRACT

The present invention relates to a transfer case for distribution of a driving force on a first axle (9) and a second axle (8) of a motor vehicle. The transfer case (1) is arranged between the first axle (9) and the second axle (8). The transfer case (1) includes a planetary gear (3) with a central gear (4) (for example, a sun gear), a central gear (5) (for example, an internal gear), and a planetary pinion support (6) with multiple planetary pinions (7), as well as an electrical machine (2). The electrical machine (2) is connected with an element (4, 5, 6) of the planetary gear (3). The distribution of the driving force on the two axles (8, 9) takes place according to the present invention by means of controlling the electrical machine (2), in order to produce a predetermined moment of rotation on of the elements of the planetary gear (3), whereby the moment of rotation of the two other elements of the planetary gear, which is connected respectively with one of the axles, are fixed.

2 Claims, 3 Drawing Sheets

TRANSFER CASE FOR MOTOR VEHICLES AND METHOD FOR DISTRIBUTION OF A DRIVING FORCE ONTO TWO MOTOR VEHICLE AXLES

BACKGROUND OF THE INVENTION

The present application relates to transfer case for distribution of a driving force on a first axle and a second axle of a motor vehicle. Furthermore, the present invention relates to a method for distributing a driving force on a first and a second axle of a motor vehicle.

In addition to front and back-wheel driven motor vehicles, today, also a multitude of all-wheel drive vehicles are produced. While the power trains for front or back-wheel driven vehicles manage with a motor and a downstream gear, with power train of an all-wheel drive vehicle, a so-called transfer case is also provided. The transfer case therefore has the purpose of distributing the entire driving power produced in the vehicle motor on the front and rear vehicle axles. These transfer cases generally provide a defined distribution of the driving force on both axles. In order to maintain traction on one axle upon a loss of traction on the other axle, in practice, a differential lock is provided. It can be designed as a frictional or visco-coupler or also as a controllable lamellae coupling. The known transfer cases, however, have the disadvantage that they are relatively expensive to construct and require a complicated control mechanism, as well as a relatively large structural space.

SUMMARY OF THE INVENTION

In contrast, the transfer case for distributing a driving force on a first axle and a second axle of a motor vehicle, according to the present invention, is very simply and compactly constructed and can be manufactured very cost-effectively. According to the present invention, the transfer case includes an epicyclic gear as well as an electrical machine. The epicyclic gear preferably is formed as a planetary gear and includes two central gears (for example, sun gear and internal gear) and a planetary support (bar) with at least one planet. The electrical machine is connected with an element of the epicyclic gear, that is, with a planetary gear, for example, either with a sun gear, an internal gear, or a planetary gear support of the planetary gear. The transfer case is arranged between the first axle and the second axle of the motor vehicle. Therefore, a coupling of the two axles of the motor vehicle takes place, as well as an electrical machine with the assistance of the epicyclic gear. According to the present invention, the degree of coupling, that is, the force distribution on the two axles, of the transfer case between the first and the second axles is controlled by the electrical machine. In other words, the power flux, which flows over the epicyclic gear, is controlled with the aid of the electrical machine. According to the present invention, therefore, a simple controlling of the distribution of force between the two driven axles is made possible. An essential advantage of the transfer case of the present invention is that already, small electrical power for controlling the electrical machine suffices, in order to control a large power flux between the two axles. Also, with a large installed output of the motor vehicle rotor, only low power in the electrical machine for controlling the power distribution is required.

The moment of rotation, with which the first axle is brake or that with which the second axle is accelerated, is directly proportional to the moment of rotation which is used by the electrical machine. With a given revolution speed, that is, with a given motor vehicle speed, the power flux from the first axle to the second axle, or vise versa, is therefore directly controllable.

The present invention exploits the fact that with an epicyclic gear, a stable connection of the moment of rotation to the gear elements (for example, with a planetary gear, sun gear, internal gear, and planetary gear support) is provided. If one of the moments of rotation is determined, based on the coupling in the epicyclic gear, the moment of rotation of the other, respective elements are provided. Together with the revolution speed, which based on the kinematic coupling of the elements in the epicyclic gear, likewise, the power, which flow to the elements of the epicyclic gear, stands in a stable proportion to one another. With the arrangement of the present invention, the front axle and the rear axle of the all-wheel drive motor vehicle is connected by means of the epicyclic gear. Therefore, the revolution speed proportion of the front and rear axles remains stable, since both axles are connected via tire and road. Therefore, the revolution speed ratio of two of the three main elements of the epicyclic gear, which are connected with the front axle or rear axle, is likewise stable. Also, the revolution speed of the third element is directly dependent on the motor vehicle speed. In other words, the revolution speed of the third element is directly proportional to the motor vehicle speed. Generally, the moment of rotation of the third element is freely selectable. According to the present invention, the moment of rotation of the third element is therefore provided by means of the electrical machine. By the free selection of the moment of rotation on the third element, however, it is further possible to ascertain the moment of rotation on the first two elements of the epicyclic gear, whereby the power flux between the two axles of the motor vehicle can be controlled.

Preferably, the epicyclic gear is formed as a planetary gear with two central gears and a planetary pinion support with at least one planetary pinion or as a differential gear.

According to a further preferred embodiment of the present invention, the main elements of the planetary gear coupled with the front axle and the rear axle are connected with the axles such that they rotate with the same speed, based on the coupling of the axles via wheel and road. The planetary gear revolves in this case as a block, so that mechanical roller losses in the gears can be avoided.

According to a preferred embodiment of the present invention, the electrical machine is connected with the sun gear of the planetary gear. Therefore, the electrical machine provides the moment of rotation for the sun gear. Preferably, the front axle is connected with the internal gear and the rear axle is connected with the planetary pinion support. For example, with a standard drive of a motor vehicle via the rear axle, with such an arrangement with a small moment of rotation on the sun gear, a large moment of rotation on the rear axle of the motor vehicle is removed and distributed on the front axle. In this manner, with such an arrangement, by braking of the sun gear by the electrical machine, the rear axle withdraws power. Therefore, a part of this power is absorbed by the electrical machine; however, the larger part of the power withdrawn to the rear axle is supplied via the planetary gear to the front axle. In order to maintain the loss as minimal as possible with this arrangement, the power removed by braking of the sun gear can be converted by means of the electrical machine into electrical energy and, for example, can be stored in a battery or can be supplied further to an electrical consumer of the motor vehicle.

It should be noted that the above-noted elements, that is, the elements of the planetary gear as well as both axles and the electrical machine, also can be combined with one another differently. This is particularly logical, then, when, for example, the motor vehicle primary drive does not take place ova the rear axle, but the front axle.

For increasing the stationary gear ratio of the planetary gear, also another structure is possible. In particular, also two internal gears or two sun gears with a planetary support and step planets can be combined.

Preferably, the transfer case includes a control apparatus, which, upon occurrence of predetermined driving situations, in particular slippage or blocking or a marked acceleration of the motor vehicle on one or both drive gears, controls a distribution of the driving force from the driven axle onto the second axle.

In order to manufacture the most compact construction possible, the planetary drive preferably is directly connected with a drive shaft of a transmission of the motor vehicle. It should be noted that it is possible, of course, that on the drive shaft of the transmission of the vehicle, an additional toothing is provided, which is used for connecting with the transfer case.

The transmission of the vehicle preferably is formed as a manual transmission, an automatic transmission, or as a CVT transmission.

Preferably, the control apparatus of the transfer case contains the data of the driving situation from an ESP and/or ABS and/or ASR.

In order to make possible recuperation by means of the electrical machine, preferably, with a driving of the rear axle, an additional switch element is arranged between the planetary pinion support and the rear axle, in order to connect the planetary pinion support with the sun gear and to break a connection to the rear axle. In this manner, the electrical machine is directly couple to the front axle, so that the generator output of the electrical machine can be completely used for recuperation.

Since the transfer case is separated from the rear axle, no reactive effect on the rear axle takes place, which positively effects the vehicle stability. In addition the above-described arrangement can also be used for a boost-operation or for an electrical auxiliary drive of the vehicle. Since the electrical machine and the front axle are coupled fixedly in a switched state, the power flux in this case can be controlled as desired. The output of the primary drive of the vehicle, therefore, is exclusively provided on the rear axle. In addition, with the above-described arrangement, also a mechanical reverse gear in the transmission of the vehicle can be omitted, since by means of the electrical machine, which exclusively drives the front axle, also electrical reverse can be driven.

According to a further preferred embodiment of the present invention, the electrical machine for the engine start of a combustion engine of the vehicle is used. Therefore, in the transmission of the vehicle, an additional switch element is provided, which is opened for starting of the engine, so that the transfer case is separated from the drive shaft of the transmission of the vehicle. At the same time, the switch coupling of a gear connected with the transfer case, as well as the primary coupling of the vehicle, is closed, so that a connection between the electrical machine and a transmission primary shaft of the vehicle transmission, and therewith, to the engine, is created. For starting of the engine, for example, the front axle can be maintained by means of an operational braking of the vehicle, so that the planetary gear can transfer a moment of rotation. Thus, with the use of the conversion of the planetary gear also with a small moment of rotation, starting of the engine takes place.

The coupling of the electrical machine or the planetary gear to the transmission primary shaft can take place via any process of the motor vehicle transmission. This arrangement variation of the present invention is also suited for operation of an air conditioning assembly in a motor vehicle. In this connection, merely the primary coupling of the vehicle must be opened, so that the connection to the motor vehicle engine is separated and the electrical machine can then drive an air conditioning compressor of the air conditioning assembly, instead of the motor vehicle engine. In this regard, the air conditioning compressor must merely be connected with the secondary shaft of the motor vehicle transmission.

With the method for distributing a driving force between two axles of a motor vehicle, according to the present invention, the distribution of the driving force takes place merely by means of controlling an electrical machine, which is connected with a epicyclic gear arranged between the first and the second axles of the motor vehicle and provides a moment of rotation for an element of the epicyclic gear. In this manner, the moments of rotation of the other elements of the epicyclic gear are provided, so that the distribution of the driving force on the two axles can take place. Preferably, the epicyclic gear is a planetary gear, so that a moment of rotation for one element (sun gear, internal gear, planetary pinion support) of the planetary gear is provided, whereby the moments of rotation of the other two elements of the planetary gear are provided.

Preferably, the electrical machine is operated as a generator of the motor vehicle, so that an alternator that is conventional in motor vehicles can be eliminated. In addition, preferably, the electrical machine is used as a recuperator for recovering braking energy. Further, the electrical machine is also used advantageously as an electrical motor vehicle drive, so that, for example, a hybrid drive is possible, or the electrical machine for a boost-operation can be used, or the electrical machine can be used for an electrical reverse driving of the vehicle. The electrical machine can also be used for operating a compressor for an air conditioning assembly in a motor vehicle. In addition, the electrical machine of the present invention can be operated, such that it can be used for an engine start of a combustion engine of a motor vehicle, so that the starter for combustion engines that is common in motor vehicles can be eliminated.

Although with a distribution of a driving force from a first axle onto a second axle according to the present invention, a loss of energy occurs by use of the electrical machine, however, this is relative small, on the one hand, since the electrical machine rotates relatively slowly; on the other hand, the electrical machine can be operated as a generator and the electrical energy produced thereby can be stored in a battery, for example. In this manner, then, a positive total energy balance nevertheless can be achieved.

Generally, the primary drive of the motor vehicle therefore must provide the sum of the power on the two axles, as well as the power removed by the electrical machine.

According to the present invention, also a method for reclaiming braking energy with a transfer case of the present invention is provided, whereby the electrical machine is operated as a generator, a connection of the transfer case to the rear axle is broken, and the planetary gear is blocked.

In addition, the present invention provides a method for starting a combustion engine with a transfer case according to the present invention. In this manner, the electrical machine is operated as a motor, a connection of the planetary gear to a primary drive shaft of the motor vehicle is separated, and the planetary gear is blocked or the auxiliary drive shaft is braked.

DETAILED DESCRIPTION OF THE PREFERRED EMBODIMENTS

Next, a transfer case according to a first embodiment in connection with a motor vehicle transmission will be described with reference to FIGS. 1 and 2.

Figure 2:
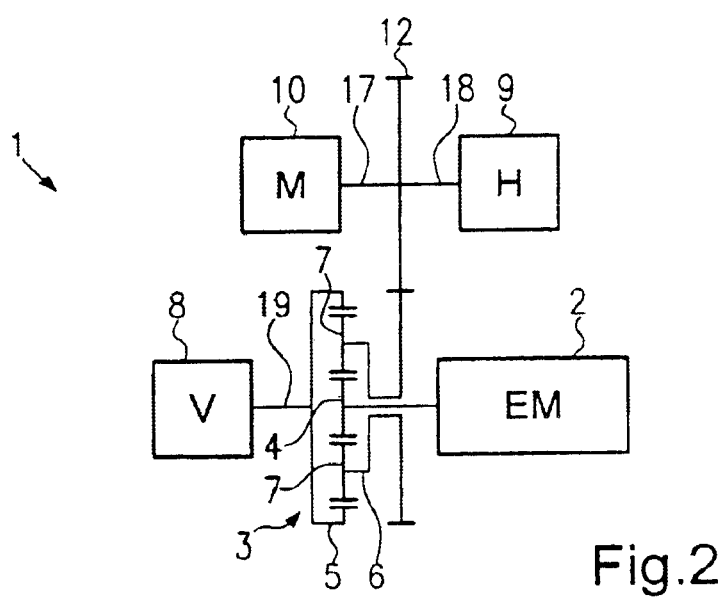
FIG. 2 shows a schematic view of the transfer case according to the present invention.

First, with reference to FIG. 2, the principle construction of the transfer case 1 of the present invention, as well as the arrangement of the transfer case 1 in the drive train of the motor vehicle is illustrated. As can be seen from FIG. 2, the transfer gas 1 comprises essentially a planetary gear 3 as well as an electrical machine (EM) 2. The planetary gear includes a sun gear 4, an internal gear 5, and multiple planets 7, which are arranged on a planetary pinion support 6. As shown in FIG. 2, the electrical machine 2 is connected with the sun gear. The internal gear 5 is connected with a front axle (V). The planetary pinion support 6 is connected with a rear axle (H) 9 via a motor vehicle transmission 12, shown only schematically in FIG. 2. The motor vehicle has a motor vehicle drive 10, which, for example, can be formed as a convention combustion engine, hybrid drive, or combustion cell drive. In the present embodiment, a combustion engine should be used as the motor vehicle drive 10.

The motor vehicle drive 10 is connected with the rear axle 9 via a primary shaft 17, the motor vehicle transmission 12, and a drive shaft 18, so that a rear gear rive is provided according to standard. According to the present invention, the front axle 8, the rear axle 9, and the electrical machine 2 are coupled to one another by means of the planetary gear 3. Since with the planetary gear 3, a fixed connection of the moment of rotation to the sun gear 4, internal gear 5, and planetary pinion support 6 elements constantly exists, by fixing a moment of rotation of one element, the moment of rotation of the respective other elements can be determined. Since, based on the kinematic coupling of the elements of the planetary gear 3, also the revolution speeds are provided in a fixed proportion to one another, with the respective moments of rotation, the elements of the planetary gear 3 provide also the power, which flow to these elements. Thus, by the specification of the moment of rotation for the sun gear 4 by means of the electrical machine 2, the power distribution between the front axle 8 coupled with the internal gear 5 and the rear axle 9 coupled with the planetary pinion support 6 can be determined. If both shafts 6 and 19, which connect the transfer case with the axles 8 or 9 of the motor vehicle, rotate with the same speed, the planetary gear 3 revolves as a block and causes thereby no loss of efficiency at all. The revolution speed of the shaft 6 (planetary support) is therefore coupled fixed via the transmission 12 with the revolution speed of the shaft 18.

Figure 1:
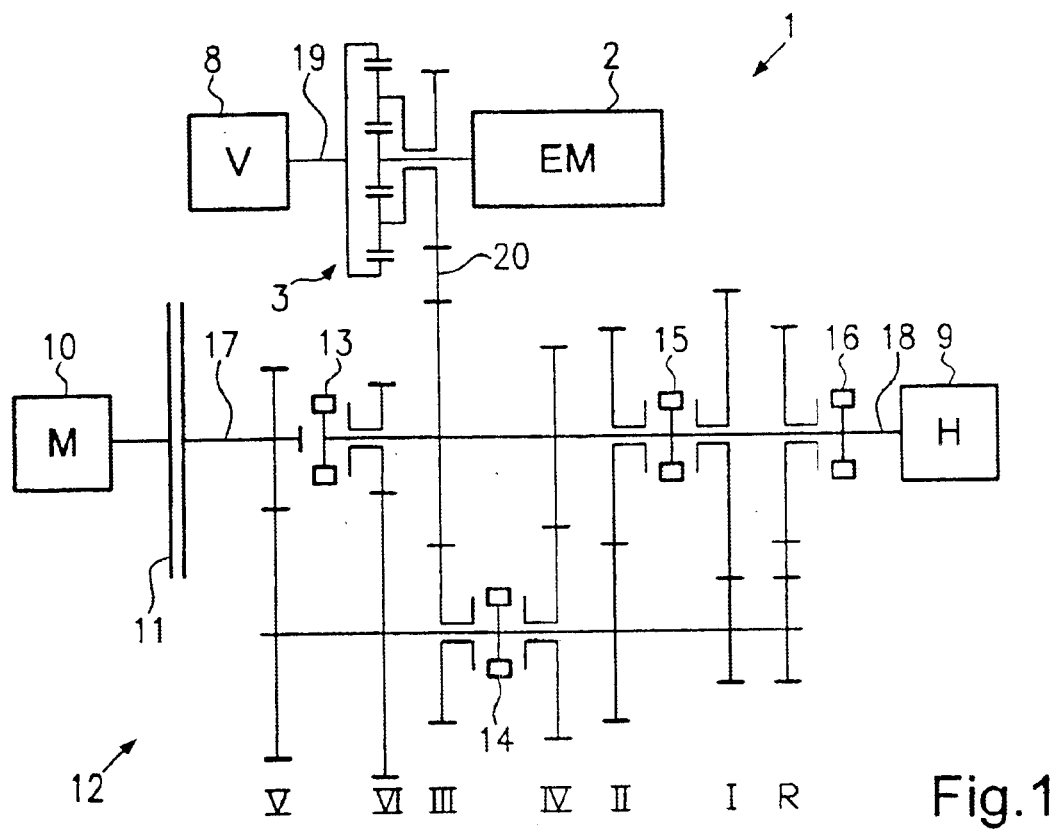
FIG. 1 shows a schematic view of an arrangement of a transfer case according to the present invention on a motor vehicle transmission.

The arrangement shown in FIGS. 1 and 2, in which the internal gear 5 is connected with the front axle 8, the planetary pinion support 6 is connected with the rear axle 9, and the sun gear 4 is connected with the electrical machine 2 is particularly favorable, since with this arrangement with a small moment of rotation on the controllable element (electrical machine) 2, large moments of rotation on the rear axle 9 of the motor vehicle can be removed. If with this arrangement, the sun gear 4 is braked by means of the electrical machine 2, power is gathered from the rear axial. A part of this power is accepted by the electrical machine. This power can be converted into electrical energy, and for example, can be stored in a battery. The larger part of the power gathered from the rear axle 9, however, is supplied to the front axle 8 via the planetary gear 3. In this manner, the distribution of the driving force can be distributed between the front axle 8 and the rear axle 9 by control of the electrical machine, and therewith, an all-wheel drive of the motor vehicle can be realized. According to the present invention, already small electrical power is sufficient, in order to control a large power flux from the rear axle 9 to the front axle 8. Particularly preferred, the above-described power distribution is performed upon occurrence of thresholds in driving behavior of the motor vehicle, such as, in particular, with a high acceleration as well as in poor adhesion of the wheels on the ground. In this case, the electrical machine 2 works in the manner of a generator.

In FIG. 1, a seven-gear transmission is illustrates as the motor vehicle transmission 12, which has six forward gears I through VI as well as a reverse gear R. In a known manner, multiple switching elements 13, 14, 15, 16 are provided, in order to position the individual gears according to the driver's wish. It should be noted that at the point of the illustrated manual transmission, also an automatic transmission or a CVT transmission can be used. In the embodiment shown in FIG. 1, the planetary pinion support 6 is connected with the gear wheels of the third gear with the drive shaft 18 of the motor vehicle transmission via an additional gear wheel 20. As the transmission type for the motor vehicle transmission 12, any type can be used, such as, for example, a transmission for a front-transverse installation or a front-longitudinal installation. In addition, between the transmission 12 and the motor vehicle drive 10, a coupler 11 is provided.

In addition, with the arrangement shown in FIG. 1, with a normal driving operation, the electric machine 2 also can be operated as a generator for the motor vehicle. In this manner, the required generator power for supply the on-board network can be applied by means of the electrical machine 2. Therefore, an alternator used commonly in motor vehicles can be eliminated.

In addition, with the first arrangement variant shown, also recuperation is possible. In a braking situation, the vehicle drive 10 accomplishes no driving power. However, the electrically controllable transfer case 1 can operates in the manner of a generator and the drive train can withdraw energy in this manner. This withdrawn energy can be stored in a battery, for example. In this type of operation, indeed the rear axle 9 would be braked, however, the front axle 8 would be driven. The rear axle is more strongly braked that the front axle is driven, so that a power flux can be branched off to a battery. Nevertheless, a large part of the power flows over the transfer case 1, the wheels, and the road in a circuit, whereby a large loss of power exists. Thus, a drive of the front axle in a braking situation can be critical for the driving dynamic. This problem, however, can be solved, in that between the transfer case 1 and the front axle 8, an additional coupling element is provided, which separates the front axle 8 and the transfer case 1 from one another in the event of the recuperation. In this connection, for example, with a hybrid vehicle at the point of the connection to the front axle 8, a connection to the electric motor can be provided, and thus, further energy can be recovered with a braking process.

Furthermore, with the arrangement shown in FIG. 1, also a so-called boost-operation can be performed, in which the electrical machine 2 is used as a motor. In this case, the electrical machine 2 supplies additional energy to the drive train and increases therewith the driving power. In addition, with this variant, also electrical driving of the vehicle can be made possible. In particular, this can be the case when a very small driving power is desired, for example, to electrically park or to advance in traffic, without having to activate the main vehicle drive 10.

Consequently, according to the present invention, a distribution of a driving force from one axle onto another axle by means of the electrically controllable planetary gear 3 takes place. Although in the illustrated embodiments, respectively, the rear axle was provided as a standard drive axle, it is also possible, of course, that the front axle is provided as a standard drive axle. Likewise, the power distribution need not be performed only upon the occurrence of threshold situations; rather, it can be performed constantly in a predetermined amount or by means of individual input of the driver.

Figure 3:
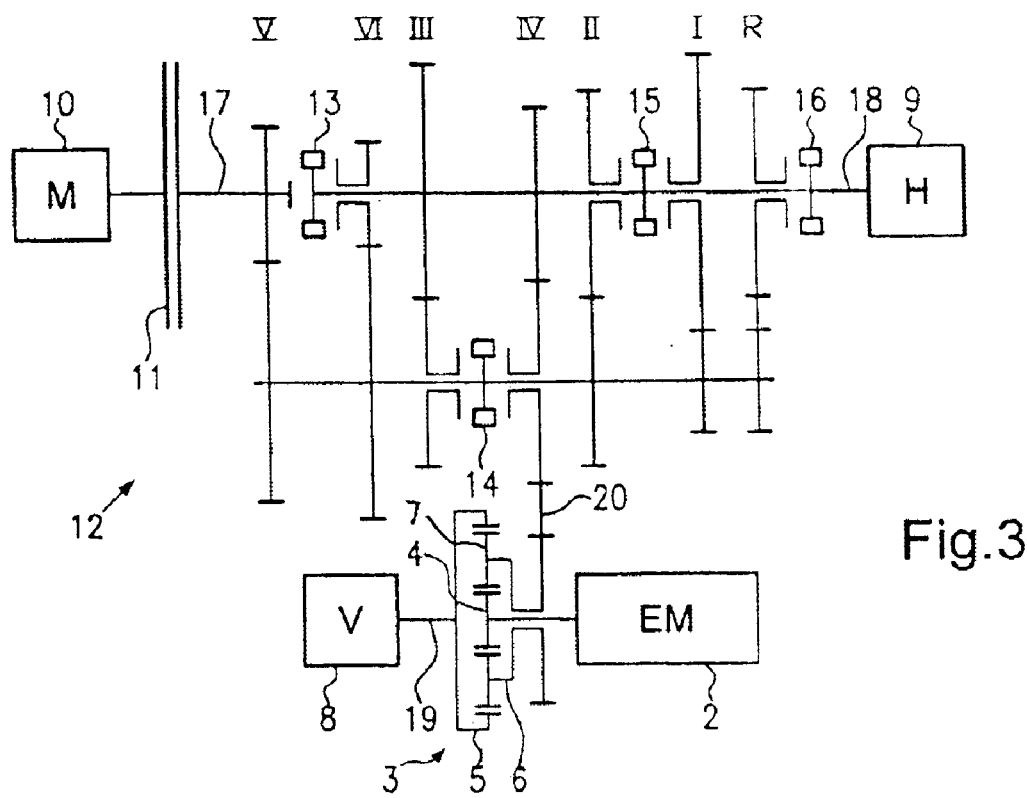
FIG. 3 shows a schematic view of a second arrangement possibility of the transfer case according to the present invention.

Next, a second embodiment of the transfer case according to the present invention will be described with reference to FIG. 3. The same or functionally similar parts are designated with the same reference numerals as those used in the first embodiment.

The arrangement variation of the second embodiment corresponds essentially to the first embodiment. However, in contrast to the first embodiment, the transfer case 1 is connected with the drive shaft 18 of the motor vehicle transmission 12 via the fourth gear. In other respects, the second embodiment corresponds to the first embodiment, so that reference is made to the description of the first embodiment.

It should be noted that, of course, instead of a coupling of the transfer case 1, also an individual catching toothing can be provided on the drive shaft 18 of the motor vehicle transmission 12. In this manner, the structural space is generally enlarged. Thus, it is preferred that the gear wheels of the motor vehicle transmission 12 are used, in order to reduce structural space.

Figure 4:
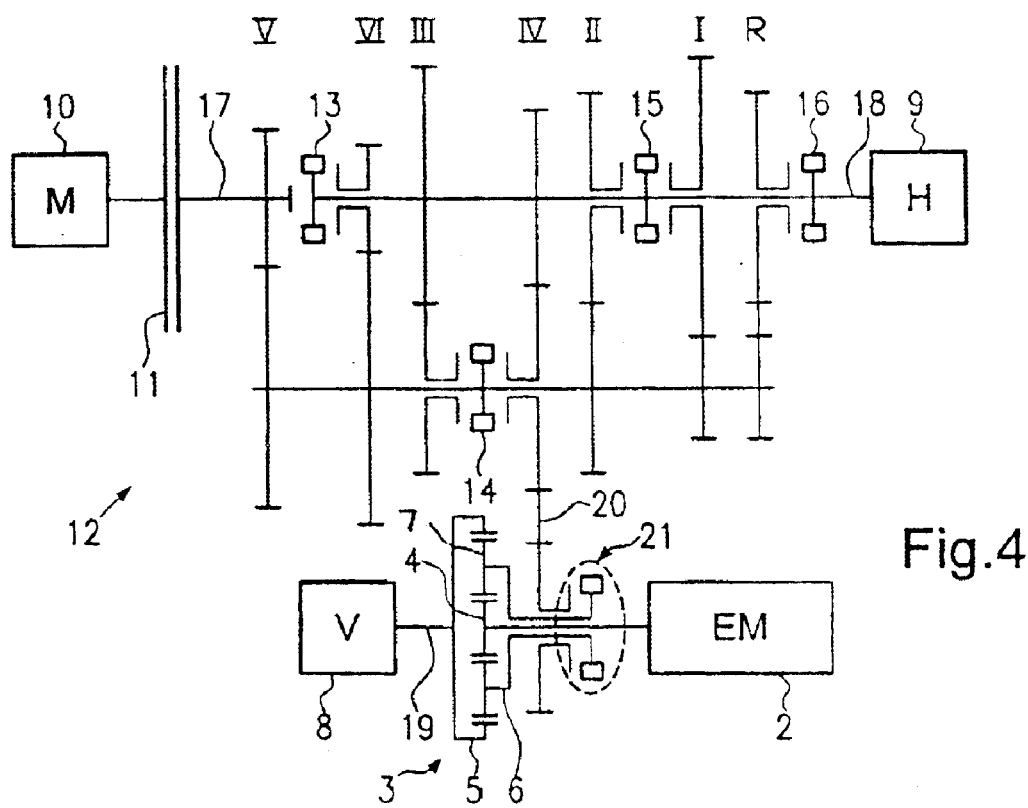
FIG. 4 shows a schematic view of a third arrangement possibility of the transfer case of the present invention.

In FIG. 4, a third arrangement variant of the transfer case 1 of the present invention is illustrated. The same or functionally similar parts are again designated with the same reference numerals as those used in the first embodiment.

As FIG. 4 shows, an additional switch element 21 is provided between the electrical machine 2 and the planetary gear 3. In a starting position of the additional switch element 21, in which the coupling gearwheel 20 is connected with the planetary pinion support 6, the arrangement is identical to that shown in FIG. 1. In a second switching position of the additional switching element 21, the planetary pinion support 6 is connected with the sun gear 4 of the planetary gear 3. At the same time, the connection to the rear axle 9 is separated. Consequently, the electrical machine 2 is directly coupled to the front axle 8. In this manner, the generator power of the electrical machine can be completely used for recuperation. A reaction on the rear axle 9 does not take place, which positively effects the vehicle stability. In addition, this switching position can also be used for the boost-operation or for an electrical auxiliary drive of the motor vehicle. Since the electrical machine 2 and the front axle 8 are fixedly coupled to one another, the power flux in this case can be controlled as desired. With a sufficient battery power, also the mechanical reverse gear in the vehicle transmission 12 can be eliminated, since it can also be electrically driven in reverse. Also, the design in which the shafts 6 and 19 to the front and rear axles rotate equally as fast is particularly advantageous in this case. In this case, no leaps in speed on the electrical machine 2 take place with the activation of the switch element 21. The switch element therefore can be activated at any time unsynchronized and still without jerks or jolts.

Figure 5:
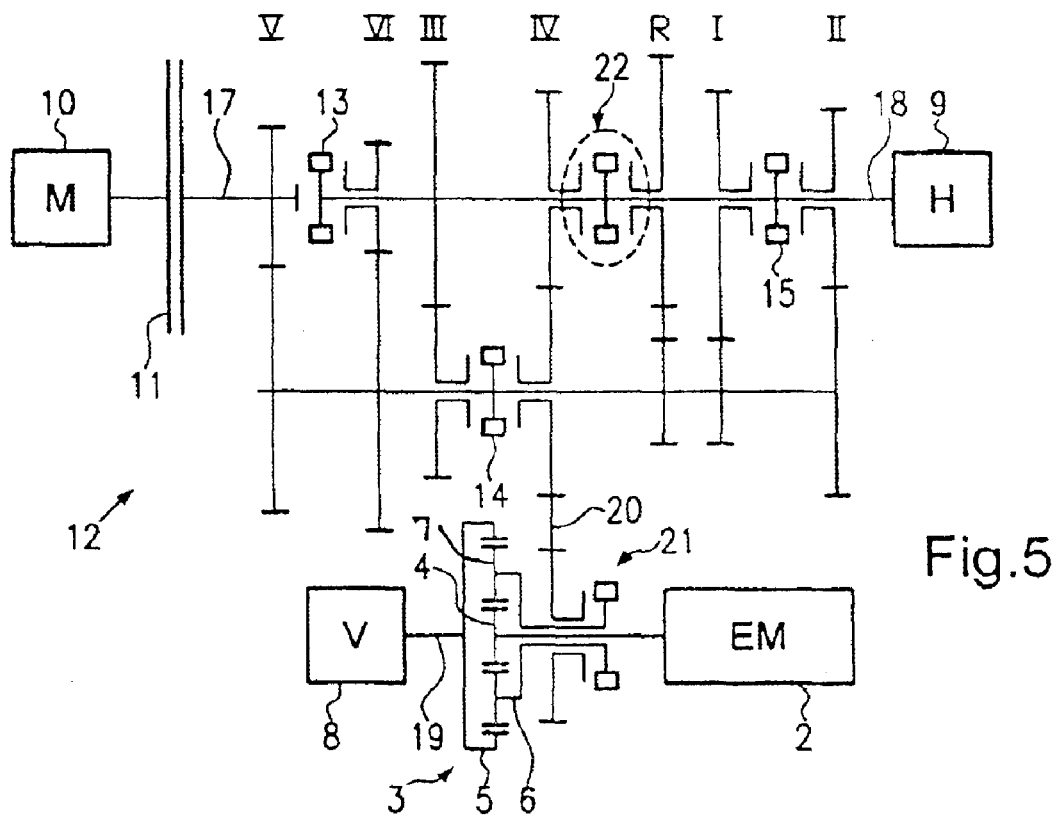
FIG. 5 shows a schematic view of a fourth arrangement possibility of the transfer case of the present invention.

In FIG. 5, a fourth arrangement variant of the transfer case of the present invention is shown. The same or functionally similar parts are again designed with the same reference numerals as those used with the previously described embodiments.

As shown in FIG. 5, a further additional switch element 22 is provided. In normal operation of the vehicle, according to this embodiment, the drive shaft wheel of the IV gear is fixedly connected with the drive shaft 18 via the switch element 22. Consequently, this arrangement behaves in normal operation like the arrangement shown in FIG. 1 or FIG. 4. By providing the additional switch element 22, the embodiment shown in FIG. 5, however, also can be used for engine starting. For engine starting, the switch element 22 is opened, so that the transfer case 1 is separated from the drive shaft 18 of the vehicle transmission 12. In addition, the switch coupling of the IV gear, as well as the primary coupling 11 is closed, so that a connection between the transfer case 1 and a transmission primary shaft, and therewith, to the vehicle engine 10, is created. For starting of the vehicle, the front axle 8, for example, by means of an operational braking of the vehicle, is fixed, so that the planetary gear 3 can transfer a moment of rotation. With the use of the conversion of the planetary gear 3, the vehicle engine 10 can be started also with a smaller moment of rotation. It should be noted that, of course, also a coupling via one of the other gears of the vehicle transmission 12 is possible. The coupling 21 for this type of operation is not necessary.

For starting of the combustion engine of the vehicle by means of the electrical machine 2, the transfer case 1 must merely be separated from the rear axle 9. A connection to the transmission primary shaft, however, must be maintained.

Figure 5A:
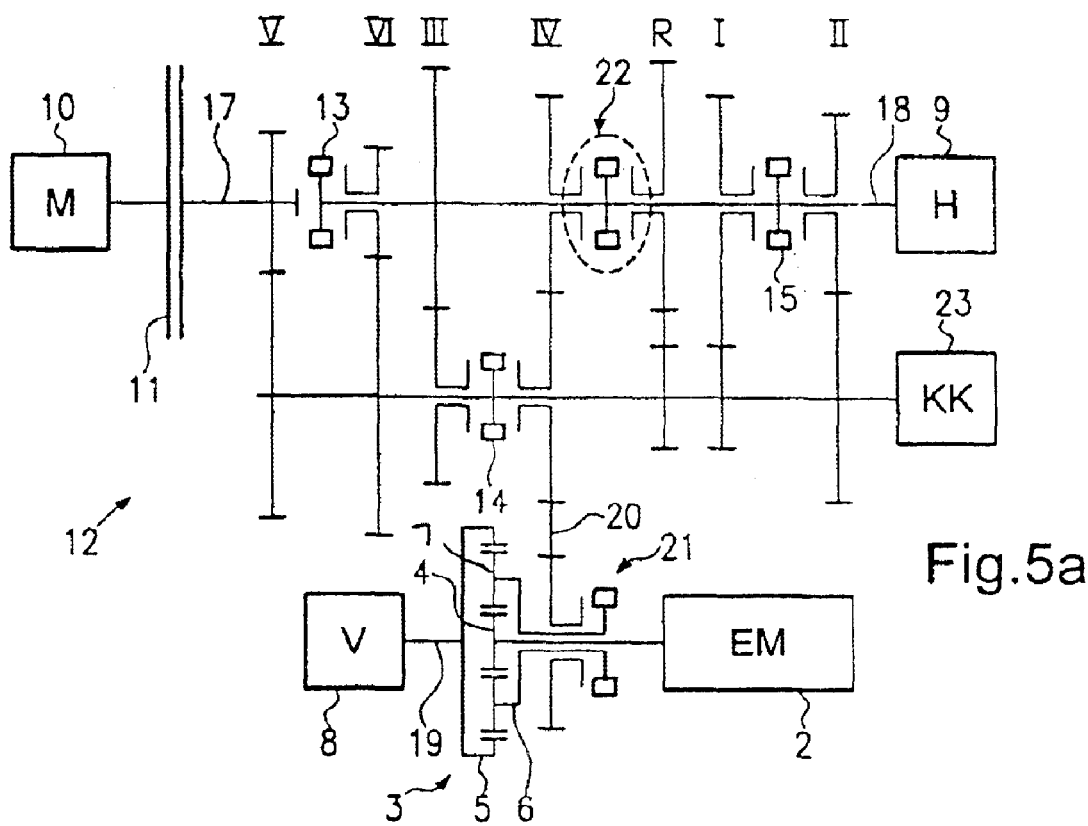
FIG. 5a shows a use of the transfer case shown in FIG. 4 for an air conditioner.

The embodiment shown in FIG. 5 can also be used for an air conditioning assembly. If an air conditioning compressor (KK) 23 is mechanically connected with the secondary shaft of the vehicle transmission 12 (compare FIG. 5a), air conditioning is also possible with the variant that is suitable for engine starting. Thus, only the primary coupling 11 must be opened. Therefore, the electrical machine 2, then, instead of the vehicle engine drives the air conditioning compressor of the air conditioning assembly.

In conclusion, the present invention relates to a transfer case for distributing a driving force on a first axle 9 and a second axle 8 of a motor vehicle. In doing so, the transfer case 1 is arranged between the first axle 9 and the second axle 8. The transfer case 1 includes a planetary gear 3 with a central gear 4 (for example, a sun gear), a central gear 5 (for example, an internal gear), and a planetary pinion support 6 with multiple planetary pinions 7, as well as an electrical machine 2. The electrical machine 2 is connected with an element 4, 5, 6 of the planetary gear 3. The distribution of the driving force on the two axles 8, 9 takes place, according to the present invention, by controlling the electrical machine 2, in order to produced a predetermined moment of rotation on one of the elements of the planetary gear 3, whereby the moments of rotation of the two other elements of the planetary gear, which are connected, respectively with the other axle, are determined.

It will be understood that each of the elements described above, or two or more together, may also find a useful application in other types of constructions differing from the types described above.

While the invention has been illustrated and described herein as transfer case for motor vehicles, as well as a method for distributing a driving force onto two vehicle axles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A method for reclamation of braking energy, comprising the following steps:
    providing a transfer case for distributing a driving force on a first axle (9) and a second axle (8) of a motor vehicle;
    arranging the transfer case between the first axle (9) and the second axle (8), wherein the transfer case includes an epicyclic gear (3) with two central gears (4,5), a rotary cross-piece (6) with at least one gear wheel (7), and an electrical machine (2);
    connecting the electrical machine (2) with an element (4, 5, 6) of the epicyclic gear (3);
    connecting one of two other elements of the epicyclic gear (3) with the first axle (9) and the other of the two other elements of the epicyclic gear with the second axle (8), wherein the distribution of the driving force on the first and the second axles (8, 9) takes place by means of control of the electrical machine (2), wherein the epicyclic gear (3) is a planetary gear with two central gears (4, 5) and a planetary pinion support (6) with at least one planetary pinion (7);
    connecting the electrical machine (2) with a sun gear (4) of the planetary gear (3), wherein the first axle (9) is a rear axle and the second axle (8) is a front axle;
    connecting an internal gear (5) of the planetary gear with the front axle (8);
    connecting the planetary pinion support (6) with the rear axle (9);
    arranging an additional switch element (21) between the planetary gear support (6) and the rear axle (9), in order to connect the planetary gear support (6) with the sun gear (4) and to break a connection to the rear axle (9);
    breaking the connection of the transfer case to the rear axle; and
    revolving the epicyclic gear (3) as a block.

2. A method for starting a combustion engine, comprising the following steps:
    providing a transfer case for distributing a driving force on a first axle (9) and a second axle (8) of a motor vehicle;
    arranging the transfer case between the first axle (9) and the second axle (8), wherein the transfer case includes an epicyclic gear (3) with two central gears (4, 5), a rotary cross-piece (6) with at least one gear wheel (7), and an electrical machine (2);
    connecting the electrical machine (2) with an element (4, 5, 6) of the epicyclic gear (3) and one of two other elements of the epicyclic gear (3) with the first axle (9);
    connecting the other of the two other elements of the epicyclic gear with the second axle (8), whereby the distribution of the driving force on the first and the second axles (8, 9) takes place by means of control of the electrical machine (2), wherein the epicyclic gear (3) is a planetary gear with two central gears (4, 5) and a planetary pinion support (8) with at least one planetary pinion (7);
    connecting the planetary gear (3) with a drive shaft (18) of a motor vehicle transmission (12) or arranging an additional toothing for connection with the gear on a drive shaft (18) of the motor vehicle transmission;
    arranging an additional switch element (22) between the planetary gear (3) and the drive shaft (18) of the motor vehicle transmission, in order to make possible a connection, of the planetary gear (3) with a motor vehicle drive (10) via a primary shaft (17) of the motor vehicle transmission and to break a connection from the planetary gear (3) to the drive shaft (18) of the motor vehicle transmission;
    operating the electrical machine as a motor;
    separating the connection of the epicyclic gear to a primary drive shaft of the motor vehicle; and
    revolving the epicyclic gear (3) as a block.

* * * * *